US008615965B2

(12) United States Patent
Kryger et al.

(10) Patent No.: US 8,615,965 B2
(45) Date of Patent: Dec. 31, 2013

(54) TUBULAR BUILDING STRUCTURE WITH HINGEDLY CONNECTED PLATFORM SEGMENT

(75) Inventors: Arne Kryger, Langeskov (DK); Lars Ryholl, Middelfart (DK)

(73) Assignee: Andresen Towers A/S, Nyborg (DK)

( * ) Notice: Subject to any disclaimer, the term of this patent is extended or adjusted under 35 U.S.C. 154(b) by 0 days.

(21) Appl. No.: 13/496,453

(22) PCT Filed: Sep. 14, 2010

(86) PCT No.: PCT/DK2010/050232
§ 371 (c)(1),
(2), (4) Date: May 9, 2012

(87) PCT Pub. No.: WO2011/032559
PCT Pub. Date: Mar. 24, 2011

(65) Prior Publication Data
US 2012/0210668 A1    Aug. 23, 2012

(30) Foreign Application Priority Data

Sep. 15, 2009  (DK) .................................. 2009 70113
Apr. 19, 2010  (DK) .................................. 2010 70152

(51) Int. Cl.
B66C 23/34    (2006.01)
E04H 12/34    (2006.01)
E04H 12/00    (2006.01)
E04B 1/00     (2006.01)
E04G 21/00    (2006.01)

(52) U.S. Cl.
USPC ..................... 52/745.18; 52/123.1; 52/651.07

(58) Field of Classification Search
USPC ............. 52/73, 110, 111, 120, 123.1, 169.13, 52/296, 651.01, 651.02, 651.05, 651.07, 52/745.17, 745.18
See application file for complete search history.

(56) References Cited

U.S. PATENT DOCUMENTS
2,066,984 A * 1/1937 Lamb ............................ 182/113

(Continued)

FOREIGN PATENT DOCUMENTS

CN    201165943 Y    12/2008
DE    10 2005 012 497    9/2006

(Continued)

OTHER PUBLICATIONS

Machine Translation of EP0632171A1.*

Primary Examiner — Ryan Kwiecinski
(74) Attorney, Agent, or Firm — Pearl Cohen Zedek Latzer Baratz LLP

(57) ABSTRACT

The present invention relates to a tubular building structure or tower 10 comprising superposed tube sections 12. At least some of the tube sections 12 are provided with platform segments 28 that are hinge-connected and foldable from a collapsed position in which they are positioned close to the tube sections 12 to a position of use in which they extend radially inwardly into the tubular building structure 10 in the mounted position of the tube sections 12. In particular the invention relates to a tube segment 16 adapted to be interconnected with other tube segments 16 to form a tubular building structure or tower 10 comprising superposed tube sections 12, each tube section being formed by interconnected axially extending tube segments 16. The tube segment 6 is provided with a platform segment 28 that is hinge-connected and foldable from a collapsed position in which it is positioned close to the tube segment 16 to 1 a position of use in which it extends radially inwardly into the tubular building structure 10 in the mounted position of the tube segments 16. The tube segment 6 may comprise flanges 17 along each side of opposite longitudinal sides of the tube segment 16 for interconnection with other tube segments 16 via registering holes in the flanges 17. Furthermore, the platform segment 28 may be hinge-20 connected to such flanges 17. The invention further relates to a method of erecting a tubular building structure 10 comprising such tube segments 16.

6 Claims, 11 Drawing Sheets

(56) References Cited

U.S. PATENT DOCUMENTS

| | | | |
|---|---|---|---|
| 2,136,696 A * | 11/1938 | Lamb | 182/113 |
| 2,882,101 A * | 4/1959 | Michalak et al. | 248/235 |
| 3,672,115 A | 6/1972 | Abe et al. | |
| 4,452,336 A * | 6/1984 | Sickler | 182/82 |
| 5,156,235 A * | 10/1992 | Preston | 182/186.9 |
| 7,739,843 B2 * | 6/2010 | Cortina-Cordero | 52/223.5 |
| 7,762,037 B2 * | 7/2010 | Meiners | 52/651.01 |
| 8,018,395 B2 * | 9/2011 | Hager | 343/890 |
| 8,033,078 B2 * | 10/2011 | Llorente Gonzalez | 52/745.04 |
| 8,186,130 B2 * | 5/2012 | Van Der Meijden et al. | 52/745.17 |
| 2001/0037614 A1 * | 11/2001 | Hambelton | 52/73 |
| 2002/0084142 A1 * | 7/2002 | Brennan et al. | 182/133 |
| 2003/0147753 A1 * | 8/2003 | Ollgaard | 416/244 A |
| 2006/0213145 A1 * | 9/2006 | Haller | 52/651.01 |
| 2008/0040983 A1 * | 2/2008 | Fernandez Gomez et al. | 52/40 |
| 2009/0211172 A1 * | 8/2009 | Scholte-Wassink | 52/40 |
| 2010/0139181 A1 * | 6/2010 | Cortina-Cordero et al. | 52/125.2 |
| 2010/0257797 A1 * | 10/2010 | Gomez et al. | 52/294 |
| 2011/0088331 A1 * | 4/2011 | Olgaard | 52/40 |

FOREIGN PATENT DOCUMENTS

| | | |
|---|---|---|
| EP | 0632171 A1 * | 1/1995 |
| EP | 1 561 883 | 8/2005 |
| EP | 1 788 242 | 5/2007 |
| EP | 1 889 988 | 2/2008 |
| EP | 1 905 921 | 4/2008 |
| EP | 1 933 029 | 6/2008 |
| EP | 2 060 706 | 5/2009 |
| EP | 2 187 050 | 5/2010 |
| FR | 2 932 512 | 12/2009 |
| JP | 07-310460 | 11/1995 |
| WO | WO 02/38953 | 5/2002 |
| WO | WO 03/069099 | 8/2003 |
| WO | WO 2005/075763 | 8/2005 |
| WO | WO 2005/118980 | 12/2005 |
| WO | WO 2009/056969 | 5/2009 |
| WO | WO 2009/097858 | 8/2009 |

* cited by examiner

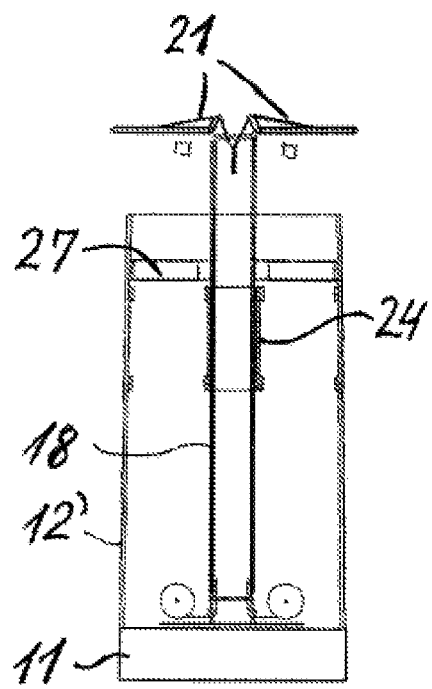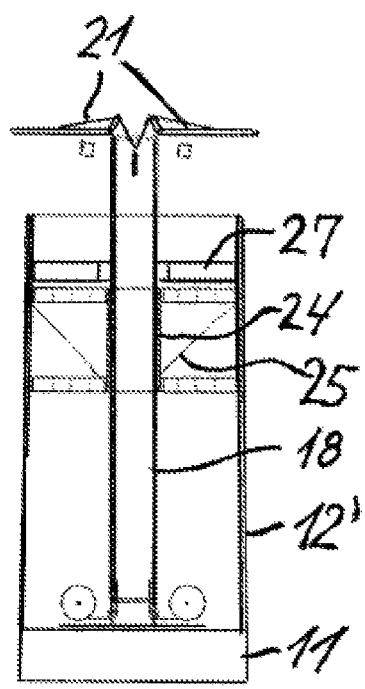
Fig.9   Fig.10
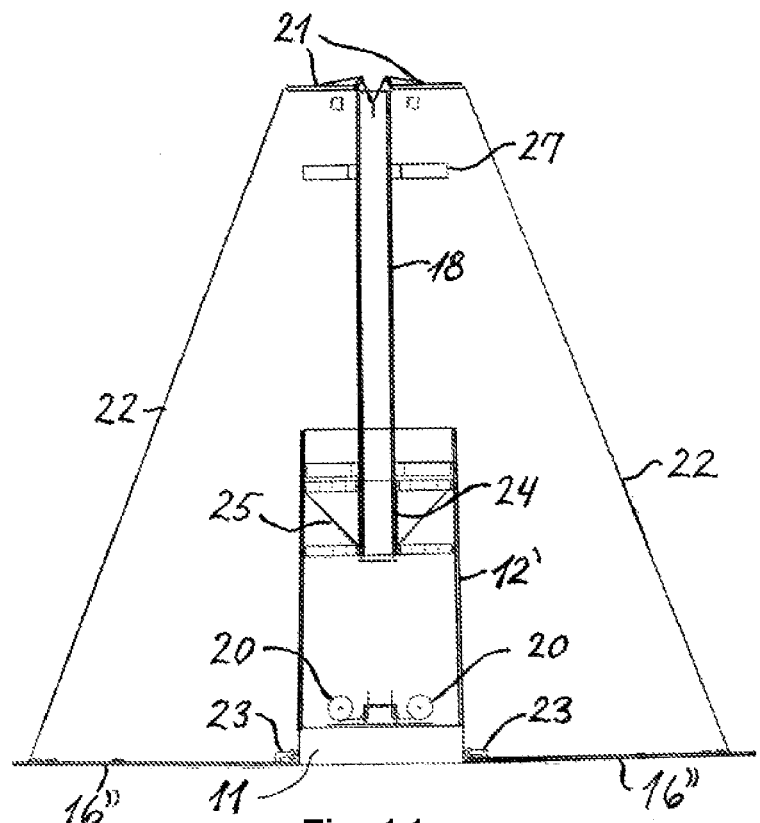
Fig.11

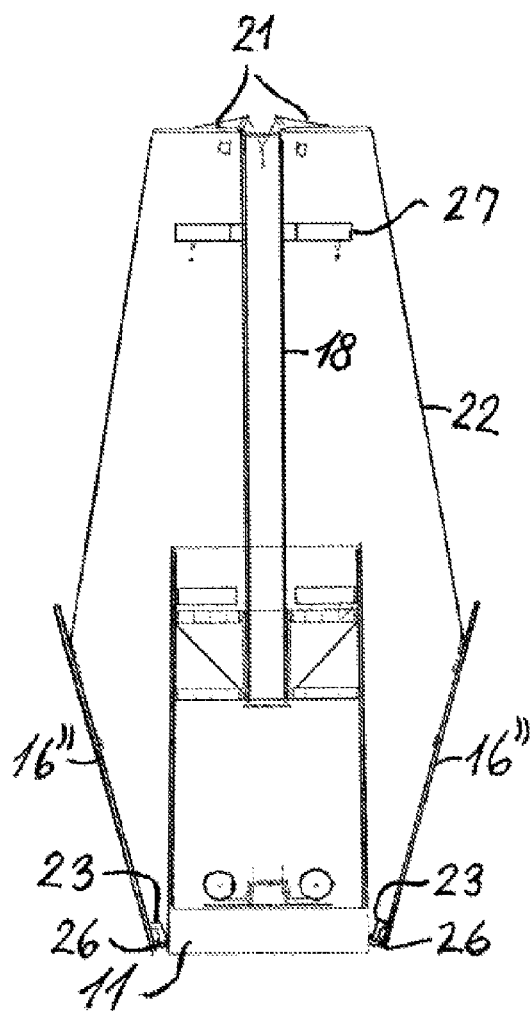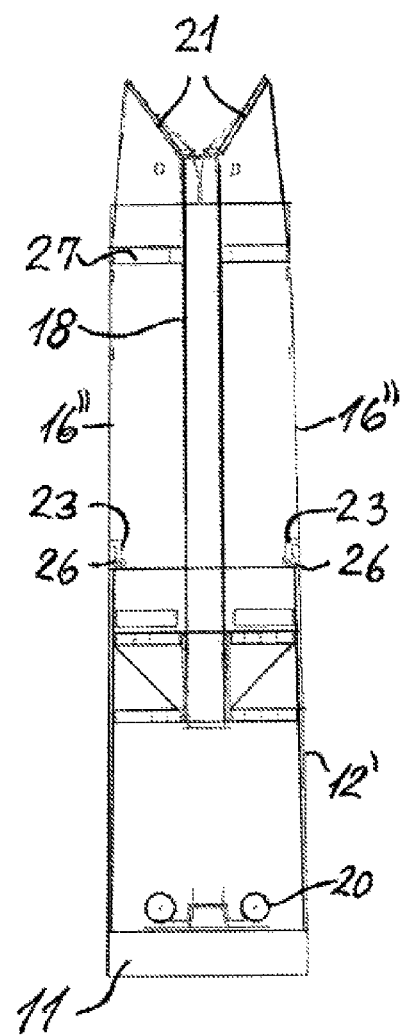
Fig.12                    Fig.13

TUBULAR BUILDING STRUCTURE WITH HINGEDLY CONNECTED PLATFORM SEGMENT

CROSS-REFERENCE TO RELATED APPLICATIONS

This application is a National Phase Application of PCT International Application No. PCT/DK2010/050232, entitled "TUBULAR BUILDING STRUCTURE WITH HINGEDLY CONNECTED PLATFORM SEGMENT", International Filing Date Sep. 14, 2010, published on Mar. 24, 2011 as International Publication No. WO 2011/032559, which in turn claims priority from Danish Patent Application No. PA 2009 70113, filed Sep. 15, 2009 and Danish Patent Application No. PA 2010 70152, filed Apr. 19, 2010, all of which are incorporated herein by reference in their entirety.

FIELD OF THE INVENTION

The present invention relates to tubular building structures or towers, such as a telecommunication tower, a wind turbine tower or the like. In particular it relates to a tubular building structure comprising a platform located inside the tubular building structure.

BACKGROUND OF THE INVENTION

Conventionally, such tubular building structures have been made from tube sections of rolled steel plate arranged on top of each other. However, in the recent years the height of such building structures and, consequently, the diameters of the tube sections have been ever increasing so that they are difficult and expensive or impossible to transport along public roads. In an attempt to solve this problem, it has been proposed to divide each tube section into a number of longitudinally extending tube segments which may be interconnected so as to form the tube sections at the building site.

Tubular building structures or towers, including those mentioned above, are normally provided with a number of internal platforms which are used by people working inside the tower during the erection of the tower and during subsequent service and maintenance. Furthermore, safety regulations require that platforms are provided at certain levels/distances so that people climbing up and down can rest, and so that things, such as tools, which are accidentally dropped land on the next platform. Known platforms are made from construction elements, typically aluminum plates. Both for towers made from continuous tube sections and for towers where each section is made from a number of tube segments, the platforms are typically delivered as separate elements and mounted inside the tower as the erection progresses or subsequently after being lifted into the desired position by a mobile crane.

OBJECT OF THE INVENTION

An object of the present invention is to provide a method of erecting a tubular building structure which is more efficient than known methods.

Another object of the present invention is to provide a method which lowers the number of separate construction elements to keep track of during storage, transportation and erection.

It is a further object of the present invention to provide an alternative to the prior art.

SUMMARY OF THE INVENTION

Thus, the above described object and several other objects are intended to be obtained in a first aspect of the invention by providing method of erecting a tubular building structure comprising superposed tube sections each being formed by interconnected axially extending tube segments, said method comprising forming a base for said building structure and at least one tube section extending upwardly there from, forming a further tube section on top of an upper tube section already positioned on said base, fastening lower parts of the tube segments of said further tube section to the upper tube section and interconnecting adjacent tube segments so as to form said further tube section, wherein at least some of the tube segments are provided with platform segments that are hinge-connected and foldable from a collapsed position in which they are positioned close to the tube segment to a position of use in which they extend radially inwardly into the tubular building structure in the mounted position of the tube segments.

By "collapsed position" and "positioned close to the tube segment" is preferably meant that the platform segments are positioned close to the tube segments along their whole length and not just in the end where the hinge-connection is. However, they may also be arranged at an acute angle to the tube segments.

Typically a number of tube sections are arranged on top of each other, and the "upper tube section" refers to the one being the uppermost until a further tube section is possibly formed on top thereof.

The platform segments are held in their collapsed position by any suitable releasable means which will be well known to a person skilled in the art. It may e.g. by straps, hooks or screws.

By such a method, the tube segments and the platform segments are typically, but not necessarily, assembled with each other at the manufacturing factory and transported to the erection site of the tower as assembled units. Hereby the number of individual construction elements to keep track of is lowered compared to known methods. It may also be possible to pack the elements more compactly on the trucks and thereby lower the transportation cost. This is particularly important for transportation over large distances or into areas which are difficult to reach, such as mountain areas. Furthermore, quality checks of the mountings of the platform segments can be performed at the manufacturing factories so that the equipment for quality control does not need to be transported to the erection site. An even further advantage of the present invention is that the work process during the erection of the tower is made more efficient. This is especially important when large mobile cranes are used, since use thereof is often paid on an hourly basis.

In some embodiments of the invention, the further tube section is formed on top of the upper tube section already positioned on said base by lifting individual tube segments into position by means of a hoisting device, which is arranged on a column positioned within said at least one tube section. An example of such a method is described in relation to the figures.

The tube segments may comprise flanges along each side of opposite longitudinal sides of the tube segments, which flanges extend radially inwardly with respect to the longitudinal axis of the tubular building structure, and the tube segments may be interconnected by use of bolts or screws via registering holes in the flanges. Alternatively the flanges may be connected by other suitable methods, such as by welding.

In embodiments comprising flanges, the platform segments may be hinge-connected to the flanges. Hereby the connection points can be at a distance from the wall of the tubular building structure, and the outer surface of the tubular building structure is not directly influenced.

In some embodiments of the invention, the platform segments are supported in the position of use by at least one of: telescopic rod, wire, knee joint or non-telescopic rod. Detailed design of the supporting means and how they are connected to the tower and the platform segments may e.g. be determined by use of computer simulations or by experimentation.

A method according to the present invention may further comprise the following three steps:
  interconnecting adjacent tube segments along a part of opposite longitudinal sides of the tube segments,
  folding the platform segments into their position of use, and
  interconnecting adjacent tube segments along a remaining part of opposite longitudinal sides of the tube segments.

Such a method is e.g. used in towers where the vertical distance between two platforms is so that the first step is performed by workers standing on a lower platform (or ground level), and the third step is performed by the workers standing on the platform that was folded to the position of use in the second step.

At least some of the objects of the present invention is also intended to be obtained in a second aspect of the invention by providing a tubular building structure comprising superposed tube sections, wherein at least some of the tube sections are provided with platform segments that are hinge-connected and foldable from a collapsed position in which they are positioned close to the tube sections to a position of use in which they extend radially inwardly into the tubular building structure in the mounted position of the tube sections. Such a tubular building structure may be made from continuous tube sections, or it may be a tubular building structure where each section is made from a number of tube segments according to a method as described above.

The objects of the invention is also intended to be obtained in a third aspect of the invention by providing a tube segment adapted to be interconnected with other tube segments to form a tubular building structure or tower comprising superposed tube sections each tube section being formed by interconnected axially extending tube segments,
wherein the tube segment is provided with a platform segment that is hinge-connected and foldable from a collapsed position in which it is positioned close to the tube segment to a position of use in which it extends radially inwardly into the tubular building structure in the mounted position of the tube segments.

Such tube segments may be used in a method according to the first aspect of the invention.

In some embodiments of the invention, the platform segment extends upwardly in the collapsed position when the tube segment is arranged in a position of use and ready for interconnection with other tube segments. Alternatively, the platform segment extends downwardly in the collapsed position when the tube segment is arranged in a position of use and ready for interconnection with other tube segments. In principle a combination of upwardly and downwardly extending platform segments may also be used if desired.

Preferred embodiments of tube segment further comprise a rail extending upward from the platform segment in the position of use. Such a rail helps preventing that people working on the platform fall down.

The rail may preferably be hinge-connected to the platform segment and foldable from a collapsed position in which it is positioned close to the platform segment to a position of use in which it extends in a substantially vertical orientation. Hereby similar advantages as mentioned for the hinge-connected platform segments are obtained.

The first, second and third aspects of the present invention may be combined. These and other aspects of the invention will be apparent from and elucidated with reference to the embodiments described hereinafter.

BRIEF DESCRIPTION OF THE FIGURES

The method of erecting a tubular building structure according to the invention will now be described in more detail with regard to the accompanying figures. The figures show one way of implementing the present invention and is not to be construed as being limiting to other possible embodiments falling within the scope of the attached claim set.

FIGS. 7-9 illustrate steps in a possible method used for forming a first tube section from a number of axially extending tube segments.

FIGS. 10-13 illustrate steps in a possible method used for forming a second tube section on top of the first tube section.

DETAILED DESCRIPTION OF AN EMBODIMENT

Figure 1:
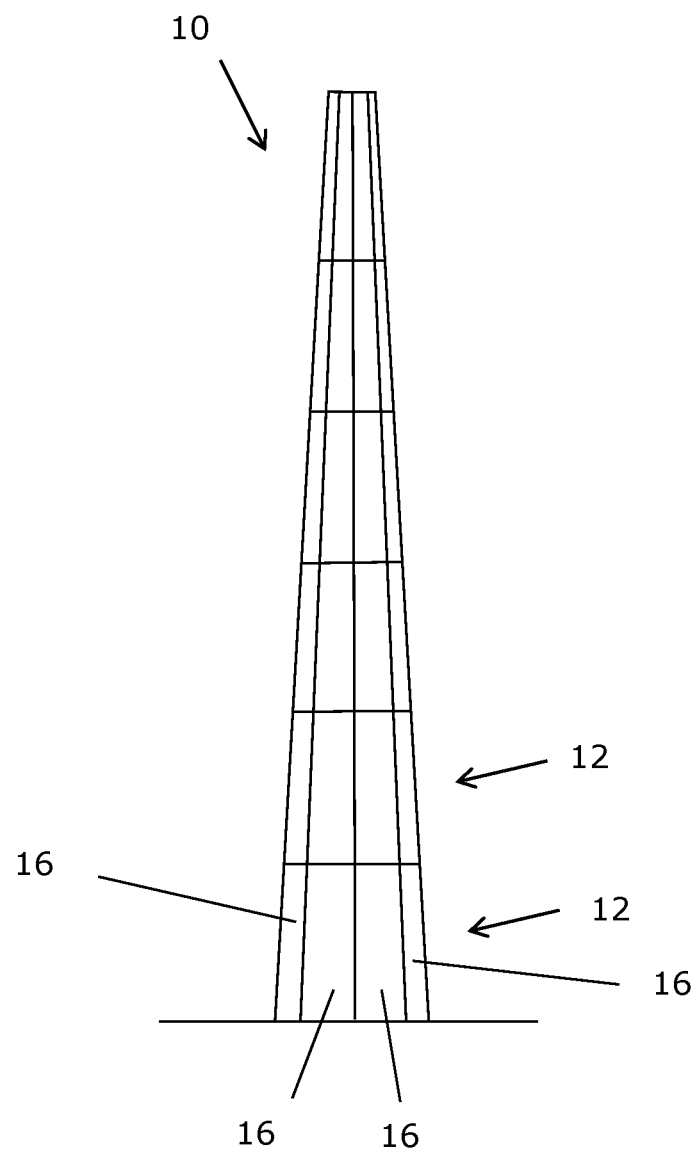
FIG. 1 shows schematically a tubular building structure formed by six tube sections and having an upwardly decreasing cross section.

FIG. 1 shows schematically the principle of having a tubular building structure or tower 10 formed by six superposed tube sections 12 each being formed by of a number of interconnected axially extending tube segments 16. The tower 10 shown in FIG. 1 has an upwardly decreasing cross section. However, the cross section may also be substantially constant or upwardly increasing depending e.g. on the actual use of the tower 10. The tower 10 typically comprises a lower base (not shown) used to ensure stable fastening/anchoring of the tower the ground. This base and possibly also the lower tube section 12 may be made conventionally or in any other suitable way.

Figure 2:
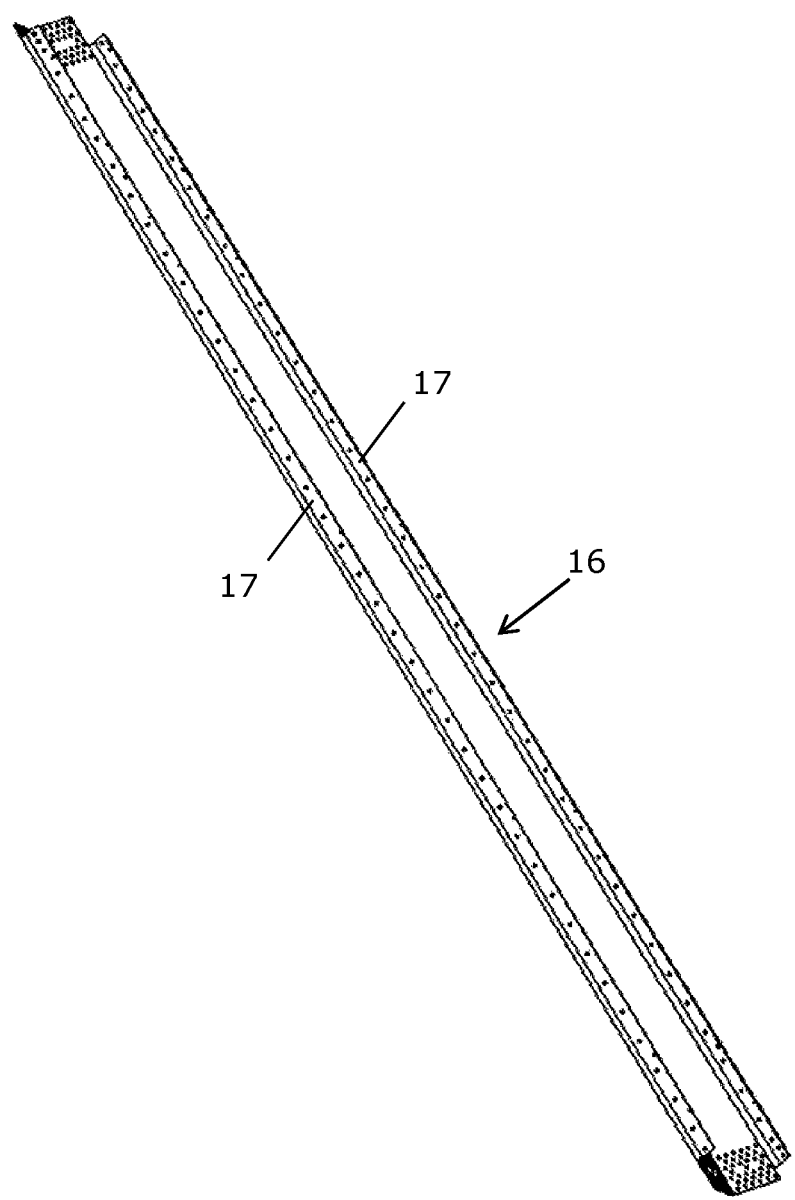
FIG. 2 shows an example of a tube segment to be used in a method according to the present invention.

FIG. 2 shows an example of a tube segment 16 to be used in a method according to the present invention. The illustrated tube segment 16 is made by bending a metal plate, so that a polygonal cross section of the tower 10 is obtained. An alternative is to use rolled plates whereby a circular cross section can be obtained. The tube segment 16 has flanges 17 along each side of opposite longitudinal sides. The flanges has registering holes for interconnection by use of bolts or screws (not shown).

Figure 3:
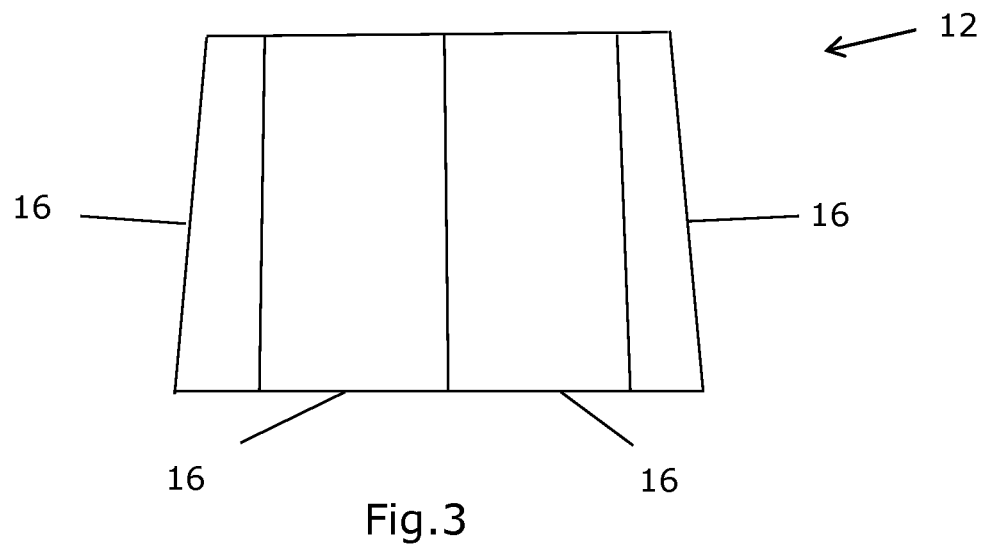
FIG. 3 shows schematically a side view of one tube section made from eight tube segments.
Figure 4:
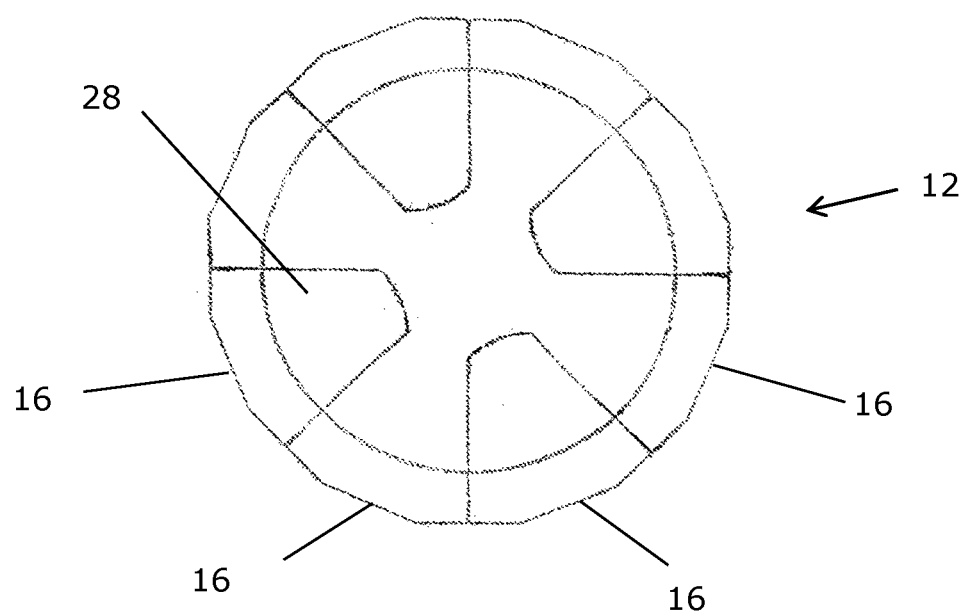
FIG. 4 shows schematically a top view of the tube section in FIG. 3 with platform segments mounted on every second tube segment.

At least some of the tube segments 16 are provided with platform segments 28 as will be described in more detail in the following. FIG. 3 shows schematically a side view of one tube section 12 made from eight tube segments 16, and FIG. 4 shows schematically a top view of the tube section 12 in FIG. 3 with platform segments 28 mounted on every second tube segment 16. The vertical lines in FIG. 3 schematically illustrate the connections between abuting tube sections 16. Details such as flanges and screws are omitted from these figures to better illustrate the overall principle. For some applications it is sufficient to have a platform segment 28 for every second tube segment 16 as in FIG. 4, whereas for other applications a substantially continuous platform along the whole inner circumference of the tower 10 is desired. Any number of tube segments 16 and platform segments 28 are considered to be covered by the scope of the present invention.

Figure 5:
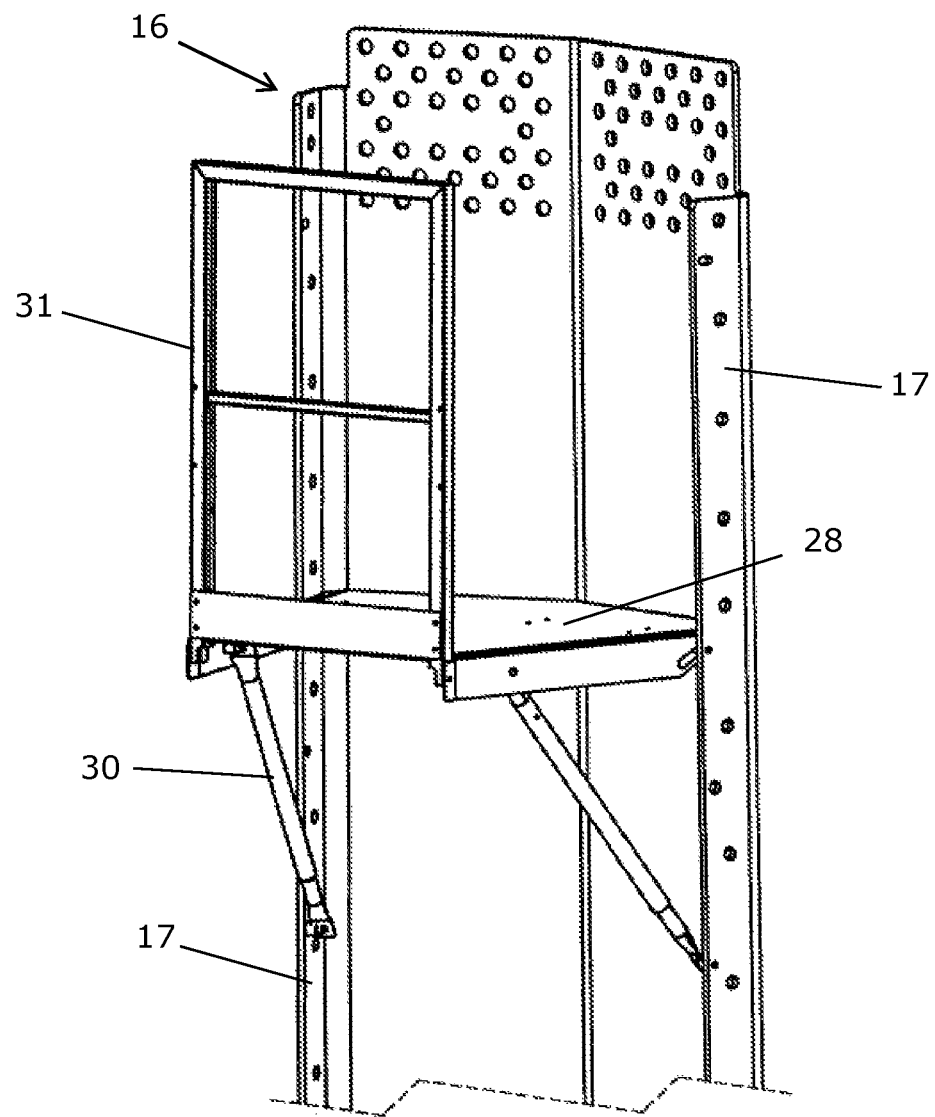
FIG. 5 shows an embodiment of a tube segment according to an aspect of the invention. The platform segment is shown in a position of use.
Figure 6:
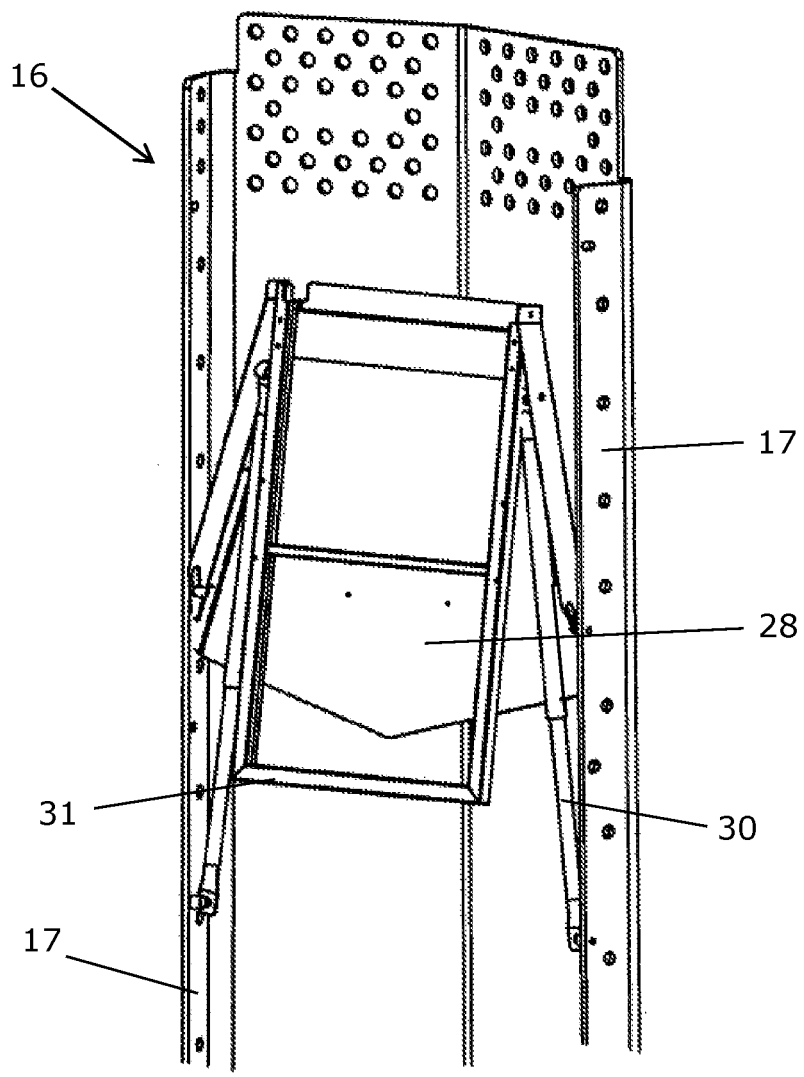
FIG. 6 shows the platform segment in FIG. 5 in a collapsed position.

FIG. 5 shows a tube segment 16 according to an aspect of the invention. The tube segment 16 has a platform segment 28 that is hinge-connected and foldable from a collapsed position in which it is positioned close to the tube segment 16 to a position of use in which it extends radially inwardly into the tower 10 in the mounted position of the tube segments 16. In FIG. 5 the platform segment 28 is shown in its position of use, and in FIG. 6 the platform segment 28 is shown in a collapsed position. The platform segment 28 is shown as being connected to the flanges 17 of the tube segment 16, but it could in principle also or alternatively be connected to the circumferential part of the tube segment 16. The connections are made by any suitable means which will be well-known to a person skilled in the art. In the illustrated embodiments, the platform segment 28 is supported in the position of use by use of telescopic rods 30. However, other suitable means could be used instead or in combination therewith. Such means could e.g. be wires connected to the flanges from a position above the platform. In the embodiments shown in the figures, the platforms are arranged along the inner circumference of the tower only. However, any radial length of the platform is covered by the scope of the invention.

The platform segment 28 preferably has an upwardly extending rail 31 in the position of use, the rail 31 protecting workers on the platform from falling down. In a similar way as explained for the platform segment 28, the rail 31 is preferably hinge-connected to the platform segment 28 and foldable from position in which it is positioned close to the platform segment 28 to a position of use in which it extends in a substantially vertical orientation. Hereby a compact, pre-assembled construction element is obtained, which is advantageous especially with respect to transportation. A further advantage of the pre-assembled design is that there are fewer parts to keep track of during storage, transportation and erection of the tower. Furthermore, the erection process is made more efficient.

A tubular building structure or tower 10 as described above may e.g. be erected by assembling the tube sections 12 at ground level and lifting an assembled further tube section 12 on top of a lower tube section 12 by use of a mobile crane.

Alternatively, the tubular building structure or tower 10 may be erected by use of a method wherein the further tube section 12 is formed on top of the upper tube section 12 already positioned on the base 11 by lifting individual tube segments 16 into position by means of a hoisting device 19, which is arranged on a column 18 positioned within the at least one tube section 12 of which the tubular building structure or tower 10 is made. Such a method will be described in the following with reference to FIGS. 7-19.

Figure 7:
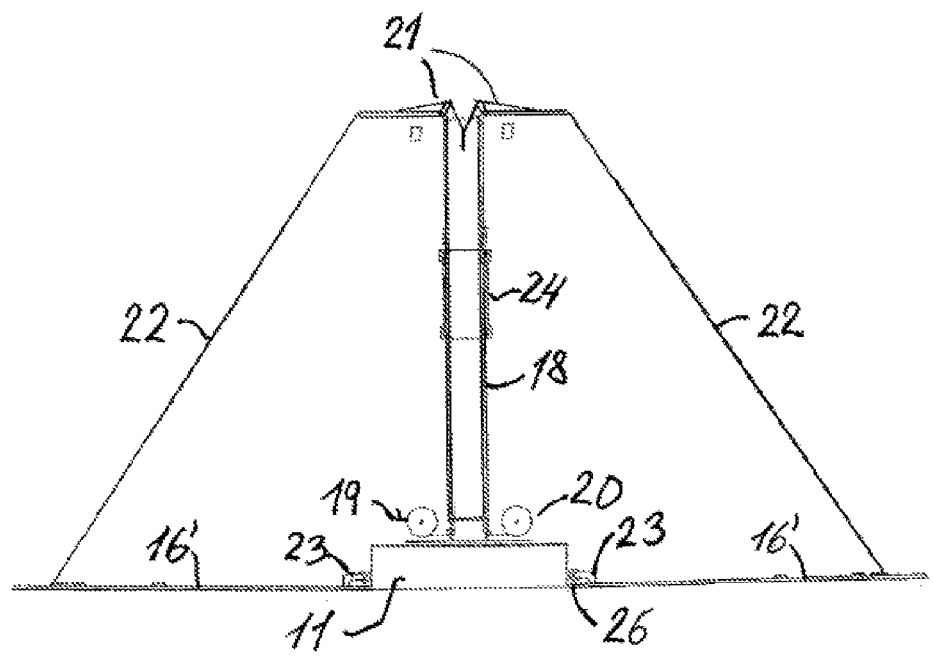
Figure 8:
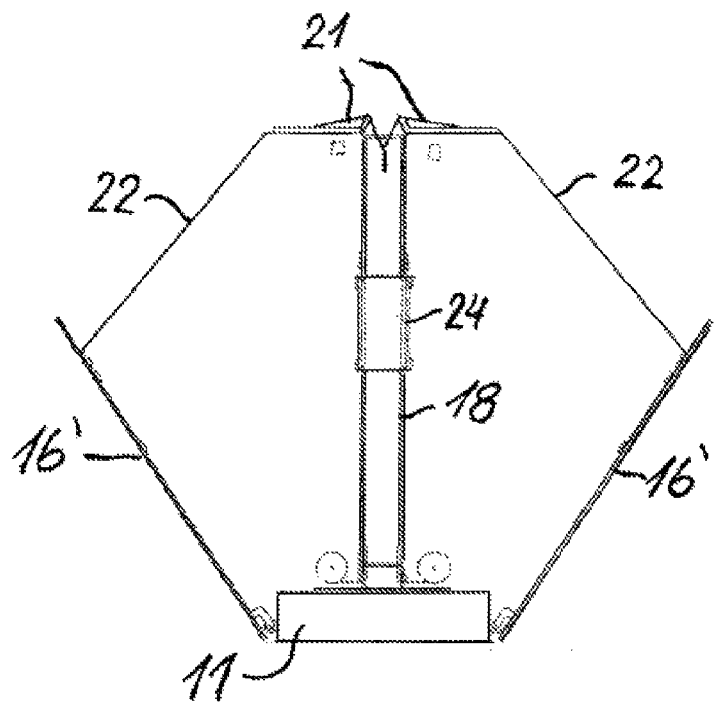

As a first step a foundation with a base section 11 is made in a conventional manner. Thereafter, an upright or column 18 carrying one or more hoisting devices 19 is erected on or inside the base section 11. Each hoisting device may comprise a winch 20 mounted on the base section 11 and a boom 21 at the top of the column 18. Because of their relatively small size compared to the size of a conventional unitary tube section, the tube segments 16 from which the tower 10 is to be built may be transported to the building site without any greater problems. The tube segments 16' for forming a first, lower tube section 12' may now be arranged around the base section 11 so that the lower end of each tube segment 16' is adjacent to the base section 11 while the tube segment 16' extends substantially radially therefrom as shown in FIG. 7. The free end of a wire 22 extending from the winch 20 via the boom 21 is now connected to the upper end of the tube segment 16', and by operating the winch 20, the tube segment 16' may be tilted into an upright position as shown in FIG. 8. The lower end of each tube segment 16' is provided with a catch or hook member 23. When a tube segment 16' has been lifted into position on top of the base section 11, the catch 23 may be hooked over the upper edge of the base section 11 and held in the correct position to ease fastening. The upper parts of the tube segments 16' engage with an abutment ring 27 arranged on the upright or column 18. The tube segments 16' may be lifted into position one at the time by means of a single hoisting device, or two or more or all of the tube segments 16' may be lifted into position at the same time by means of a corresponding number of hoisting devices. When one or a few hoisting devices are used, they are preferably horizontally movable, such as by rotation, with respect to the longitudinal axis of the tower 10. Thereafter the lower end of each tube segment 16' is fastened to the base section 11 and the flanges 17 of adjacent tube segments 16' may be interconnected in a manner described in more detail in the following. A first tube section 12' has now been formed on and fastened to the base section 11.

The column or upright 18 may be telescopically extensible so that its height may be adapted to the increasing height of the tower 10 being built. In the embodiment shown in the drawings, a sleeve 24 is arranged around the column 18, see FIG. 9. When the first tube section 12' has been finished on top of the base section 11, the sleeve 24 is fastened to the inner surface of this first tube section 12' by means of a connection structure 25, see FIG. 10. Then the column 18 is displaced upwardly in relation to the fixed sleeve 24 as illustrated in FIG. 11, for example by using the winches 20 or another lifting device, not shown. When the column 18 has reached a position in which the booms 21 are vertically spaced from the upper part of the first tube section 12' by at least the axial length of a tube section 12, the column or upright 18 is fastened to the sleeve 24.

Tube segments 16" for forming a second tube section 12" on top of the already formed first tube section 12' may now be arranged around the base section 11 as shown in FIG. 11, and the free ends of the wires 22 extending from the winch 20 via the boom 21 are now connected to the upper end of the tube segments 16", and by operating the winches 20, the tube segments 16" may be tilted into an upright, slanting position as shown in FIG. 12. Now, the tube segments 16" are lifted so that a roller 26 mounted on the hook member 23 is engaging with the outer surface of the first tube section 12'. When the lower end of the tube segment or segments 16" has/have reached the upper edge of the first tube section 12', the booms 21 are lifted as shown in FIG. 13 so as to move the tube segments 16" into to a substantially vertical position, and the hook members 23 are moved into engagement with the upper edge of the first tube section 12' so as to keep the lower ends of the tube segments 16" in the correct position in relation to the first tube section 12'. An abutment ring 27 fastened to the upright or column 18 is used for positioning the upper parts of the tube segments 16". As described in connection with the construction of the first tube section 12', the tube segments 16" may be lifted one at the time by means of a single hoisting device or two or more or all of the tube segments 16" may be lifted at the same time by means a corresponding number of hoisting devices 19. When the tube segments 16" of the second tube section 12" have been lifted into position they are connected to the adjacent lower first tube section 12' by means of bolts or screws and the flanges 17 of adjacent tube segments 16" are also interconnected by means of bolts or screws.

Figure 14:
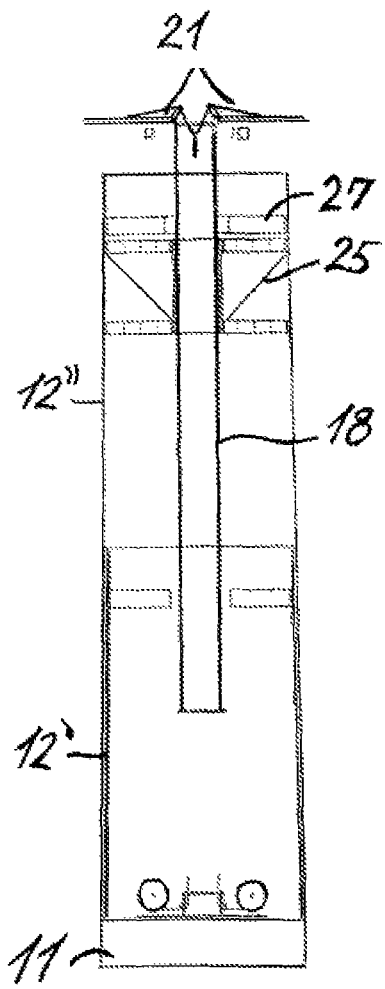
FIGS. 14-19 illustrate steps in a possible method used for forming a third tube section on top of the second tube section.
Figure 15:
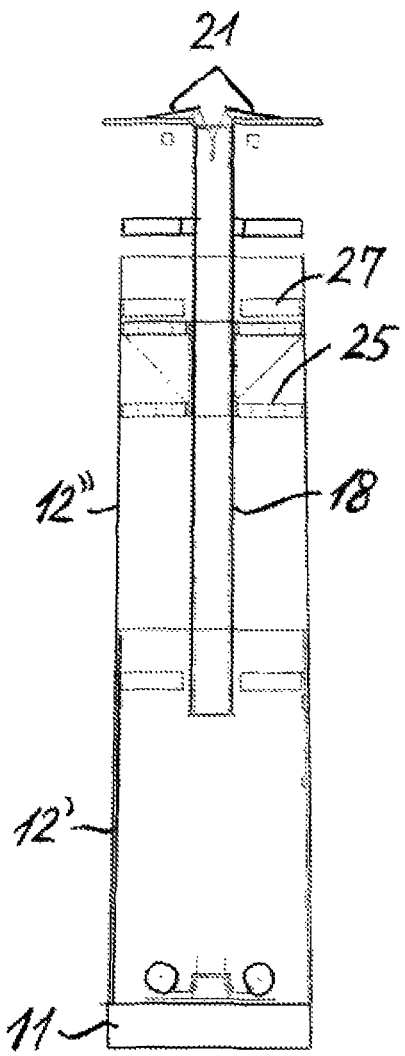
Figure 16:
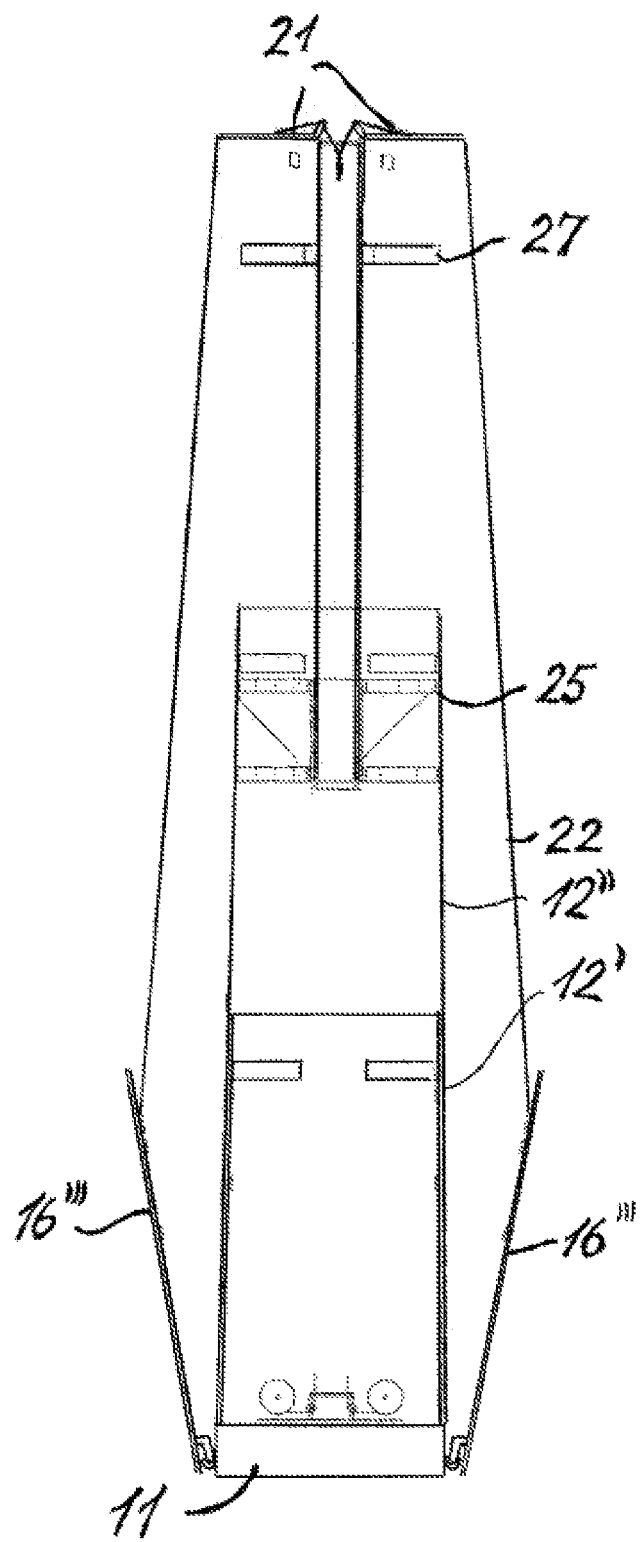
Figure 17:
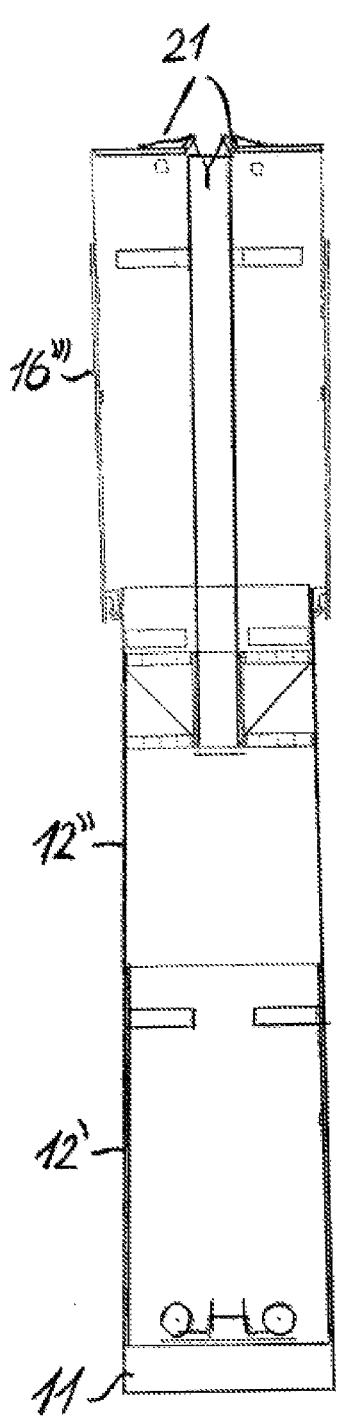
Figure 18:
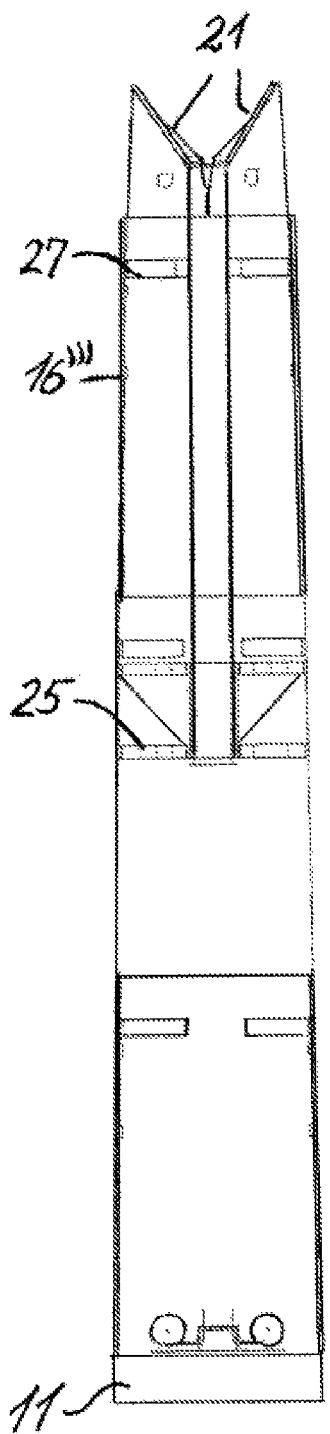
Figure 19:
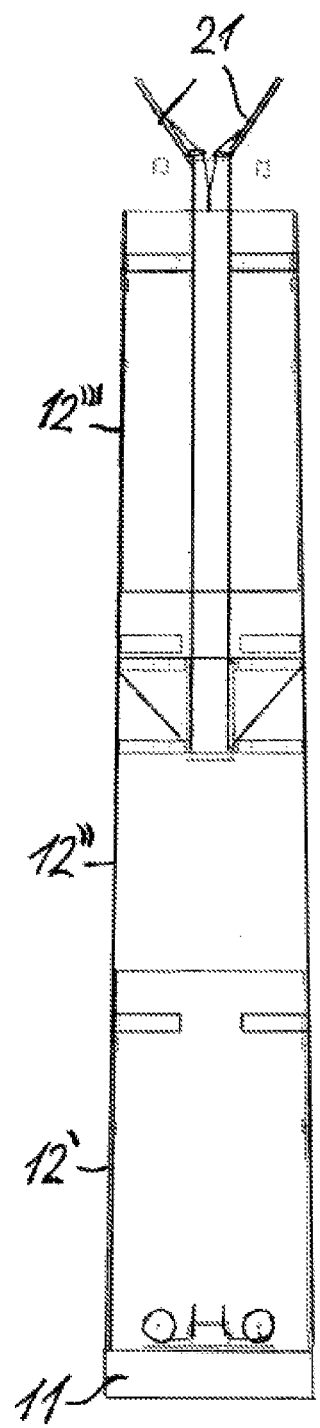

As a preparation for forming a third tube section 12''', the connecting structure 25 is released from the first tube section 12' and moved upwardly into the second tube section 12" and fastened thereto, and the column 18 is moved upwardly in relation to the connecting structure 25 so that the booms 21 are arranged at a vertical distance from the upper end of the second tube section 12" exceeding the axial length of a third tube section 12''' to be constructed on top of the second tube section 12", see FIGS. 14-16. As illustrated in FIGS. 16-19, a third tube section 12''' and possible further tube sections may now be constructed in a manner corresponding to that described in connection with the second tube section 12".

In the latter described method, the platform segments 28 can be used also during erection of the tubular building structure or tower 10 by the method further comprising the following steps:
  interconnecting adjacent tube segments 16 along a part of opposite longitudinal sides of the tube segments 16,
  folding the platform segments 28 into their position of use, and
  interconnecting adjacent tube segments 16 along a remaining part of opposite longitudinal sides of the tube segments 16.

The platform segments 28 can thus be used by workers standing on a lower platform (or ground level) when performing the first step, and the third step can be performed by the workers standing on the platform that was folded to the position of use in the second step. Alternatively, or in combination therewith, the tube segments 16 can be assembled by workers suspended from upper platforms in suitable holding means, such as chairs.

Although the present invention has been described in connection with the specified embodiments, it should not be construed as being in any way limited to the presented examples. E.g. the illustrated geometry and number of tower sections and tower segments may vary from the ones shown in the figures. The description is focused on tubular building structures wherein the tube sections are formed from tube segments that are joined as part of the erection process. However, in the broadest aspect of the invention, the hinge-connected platform segments are used in a tubular building structure formed from continuous tube sections.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of erecting a tubular building structure, said method comprising:
  forming a base for said building structure and at least one tube section extending upwardly therefrom;
  forming a further tube section on top of the at least one tube section already positioned on said base, wherein the further tube section comprises tube segments and the tube segments comprise flanges along opposite longitudinal sides of the tube segments, the flanges extending radially inwardly with respect to a longitudinal axis of the tubular building structure,
  fastening lower parts of the tube segments of said further tube section to the at least one tube section and
  interconnecting adjacent tube segments of the further tube section by use of bolts or screws via registering holes in the flanges;
wherein a plurality of the tube segments of the further tube section are provided with platform segments that are hinge-connected and foldable from a collapsed position in which the platform segments are positioned close to the tube segment to a position of use in which the platform segments extend radially inwardly into the tubular building structure in a mounted position of the tube segments, and wherein the platform segments are hinge-connected to the radially inwardly extending flanges.

2. A method according to claim 1, wherein the further tube section is formed on top of the at least one tube section already positioned on said base by lifting the individual tube segments of the further tube section into position by means of a hoisting device, said hoisting device arranged on a column positioned within said at least one tube section.

3. A method according to claim 1, wherein the platform segments are supported in the position of use by at least one of: telescopic rods, wires, knee joints or non-telescopic rods.

4. A tube segment adapted to be interconnected with other tube segments to form a tubular building structure or tower comprising superposed tube sections, each tube section being formed by interconnected axially extending tube segments, wherein each tube segment comprises flanges along each of opposite longitudinal sides of the tube segment, which flanges extend radially inwardly with respect to a longitudinal axis of the tubular building structure or tower, and each tube segment is adapted to be interconnected with other tube segments by use of bolts or screws via registering holes in the flanges, wherein the tube segment is provided with a platform segment that is hinge-connected to the radially inwardly extending flanges and foldable from a collapsed position in which said platform segment is positioned close to the tube segment to a position of use in which said platform segment extends radially inwardly into the tubular building structure in the mounted position of the tube segments.

5. A tube segment according to claim 4, further comprising means adapted to support the platform segment in the position of use, the means being selected from: telescopic rod, wire, knee joint or non-telescopic rod.

6. A tube segment according to claim 4, further comprising a rail extending upward from the platform segment in the position of use, wherein the rail is hinge-connected to the platform segment and foldable from a collapsed position in which the rail is positioned close to the platform segment to a position of use in which the rail extends in a substantially vertical orientation.

* * * * *